United States Patent [19]

Pauwels

[11] 4,385,528

[45] May 31, 1983

[54] BRAKE PEDAL LINKAGE ASSEMBLY

[75] Inventor: Edward M. Pauwels, South Bend, Ind.

[73] Assignee: The Bendix Corporation, Southfield, Mich.

[21] Appl. No.: 195,036

[22] Filed: Oct. 8, 1980

[51] Int. Cl.³ ............................ G05G 1/04; G05G 1/14
[52] U.S. Cl. ........................................ 74/516; 74/512; 74/518
[58] Field of Search ........................ 74/512, 516, 518

[56] References Cited

U.S. PATENT DOCUMENTS

| | | | |
|---|---|---|---|
| 2,706,020 | 12/1953 | Freers | 74/516 |
| 2,755,891 | 7/1956 | Levell | 74/516 |
| 3,646,831 | 3/1972 | Janosi | 74/518 |
| 3,719,106 | 3/1973 | Schroter | 74/518 |
| 3,810,400 | 5/1974 | Schroter | 74/518 |
| 3,858,457 | 1/1975 | Mathues | 74/516 |
| 3,911,760 | 10/1975 | Elbers | 74/512 |
| 3,988,945 | 11/1976 | Fasano | 74/512 |
| 4,005,617 | 2/1977 | Sourbel | 74/516 |
| 4,026,164 | 5/1977 | Mozingo | 74/478 |
| 4,069,722 | 1/1978 | Derrick | 74/516 |
| 4,132,127 | 1/1979 | Fulmer | 74/512 |
| 4,152,952 | 5/1979 | Fulmer | 74/517 |

Primary Examiner—Leslie A. Braun
Assistant Examiner—Joseph M. Rolnicki
Attorney, Agent, or Firm—Paul David Schoenle; Ken C. Decker

[57] ABSTRACT

A brake pedal linkage includes a pair of levers (18,20), a first connecting member (26) and a second connecting member (28). The first connecting member defines a lost-motion connection with a master cylinder and the second connecting member defines a lost-motion connection with one of the pair of levers. The first connecting member extends between a brake pedal and a master cylinder and cooperates with the pair of levers such that the master cylinder travel is greater than the brake pedal during an initial stage of braking, less than the brake pedal during an intermediate stage of braking, and equal to the brake pedal during a final stage of braking.

7 Claims, 5 Drawing Figures

BRAKE PEDAL LINKAGE ASSEMBLY

In a conventional brake system, a brake pedal is pivotally secured to a portion of a vehicle frame and the brake pedal is coupled to a master cylinder such that a pivoting brake pedal causes an input member of the master cylinder to move, thereby generating fluid pressure within the master cylinder.

Various linkage assemblies between the brake pedal and the master cylinder have been provided to control the operation of the master cylinder in response to actuation of the brake pedal. In particular, these linkages have provided a variance between pedal travel and master cylinder travel so that during an initial brake application, the master cylinder will quickly take up any slack in the brake system to immediately develop braking friction. The application of this teaching has been especially important in attempting to eliminate brake drag caused by friction pads which lightly contact a rotating member when braking is inoperative. By designing a larger clearance between the friction pads and the rotating member while also providing a quick takeup, it is possible to substantially eliminate brake drag and also reduce reaction time between pedal actuation and friction pad engagement with the rotating member.

The present invention provides a simple linkage assembly to provide a faster rate of travel for a master cylinder than a brake pedal during initial actuation of the brake pedal. The linkage assembly also provides a faster rate of travel for the brake pedal than the master cylinder during an intermediate stage of brake pedal actuation, and during a final stage of brake pedal actuation, the pedal and master cylinder move at the same rate of travel. In particular, the linkage assembly includes a pair of levers or members pivotally secured to the vehicle frame, a first connecting member between the brake pedal and the master cylinder assembly and a second connecting member between the pair of levers. The first connecting member defines a first lost-motion connection with the master cylinder assembly and the second connecting member defines a second lost-motion connection with one of the pair of levers.

It is an advantage of the present invention that the ratio of brake pedal travel to master cylinder travel is less than one initially when it is desirable to take up fluid slack in a brake system, greater than one when it is desirable to generate braking pressure during an intermediate stage of braking, and equal to one during a final stage of braking. Also, the present invention utilizes a plurality of levers or members which are simple in construction and easily assembled to generate a variable ratio between the brake pedal and the master cylinder.

One way of carrying out the invention is described in detail below with reference to the drawings.

Figure 1:
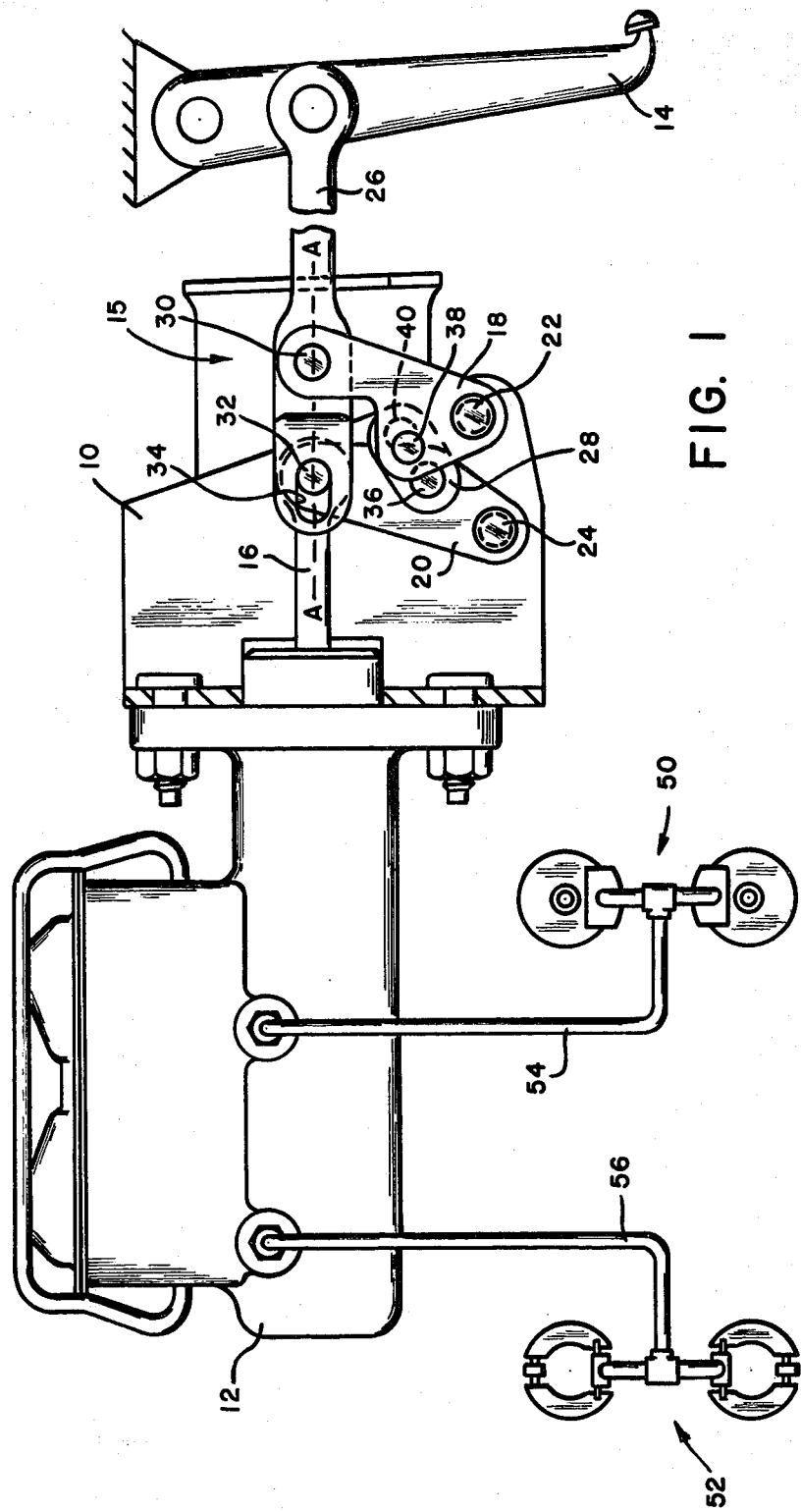
FIG. 1 is a side view of a brake pedal linkage assembly extending between a brake pedal and a master cylinder assembly.

In FIG. 1 a vehicle frame 10 supports a master cylinder assembly 12, a brake pedal 14 and a brake pedal linkage assembly 15. The pedal 14 is adapted to pivot relative to the frame in a conventional manner and the master cylinder assembly 12 includes an input rod 16 which moves axially relative to the frame 10. The assembly 15 includes a pair of levers 18 and 20 which are pivotally secured to frame 10 via respective pins 22 and 24. A first connecting member 26 is coupled to the brake pedal 14 and the master cylinder 12 via input rod 16. A second connecting member 28 extends between the pair of levers at a middle position. The lever 18 is pivotally connected to the first connecting member 26 via pin 30. A pin 32 pivotally fixes the lever 20 to the master cylinder rod 16 and extends into a slot 34 on the first connecting member 26. A pin 36 pivotally fixes the second connecting member to lever 20 and a pin 38 fixed to lever 18 extends into a slot 40 on the second connecting member at one end thereof.

The connecting member 26 and the master cylinder input rod 16 define a horizontal axis A—A intersecting the pins 30 and 32. In the rest position of FIG. 1, the pin 38 is closer to the axis A—A than the pin 36 and the pin 22 is closer to the axis A—A than the pin 24. During a brake application the position of the pins 36 and 38 relative to the axis A—A changes so that in FIG. 3 it is seen that pin 36 is closer to the axis A—A than pin 38. The horizontal position of pins 22, 24, 30, and 32 relative to the axis A—A remains the same during the brake application.

FIG. 1 shows the linkage assembly 15 in the rest position. In the rest position, the pin 38 is positioned at the end of slot 40 closest to pin 36 and the pin 32 is positioned at the end of slot 34 remote from the master cylinder 12. The master cylinder 12 communicates with front and rear brake assemblies 50 and 52, respectively via conduits 54 and 56. When a brake application is initiated, the brake pedal 14 is pivoted in a clockwise direction to impart travel to the connecting member 26. For an instant, the connecting member 26 also imparts movement to the master cylinder rod 16. The lever 18 pivots relative to pin 22 in response to movement of pin 30 on connecting member 26. The pivoting lever 18 biases the connecting member 28 to move to the left via pin 38 which is positioned at the left end of slot 40 in abutting engagement with the connecting member 28. Movement of the connecting member 28 causes the lever 20 to also pivot relative to the frame. Because of the initial positions of pins 36 and 38 relative to pins 24 and 22, the pivotal movement of lever 18 in response to movement of pin 30 causes lever 20 to pivot via connecting member 28 such that pin 32 on lever 20 moves a greater distance than pin 30 on connecting member 26. The pin 38 moves through a circular arc with pin 22 as its center and the pin 36 moves through a circular arc with pin 24 as its center. With the pin 38 initially disposed at a higher position on its arc than pin 36, the connecting member 28 moves the pin 36 and the lever 20 through a larger angle relative to pin 24 than for a given angular rotation for lever 18. This larger angular rotation for lever 20 imparts a larger travel for pin 32 than for pin 30, as mentioned earlier. Consequently, during an initial brake application, the master cylinder travel as measured by movement of input rod 16 is greater than the brake pedal travel as measured by movement of connecting rod 26.

Figure 2:
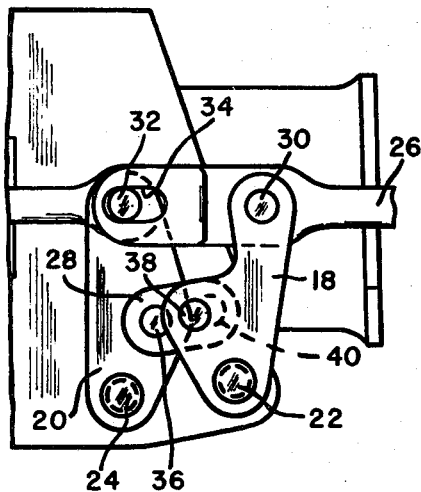
FIG. 2 is a view similar to FIG. 1 showing the linkage assembly in an intermediate stage of a brake application.

As shown in FIG. 2, the increased travel for the master cylinder during initial braking causes the pin 32 to move within the slot 34 relative to the connecting member 26. When the lever 18 has pivoted approximately 15° from its rest position the pin 32 has traveled from one end of the slot 34 to the other end. Thereafter, the connecting lever continues to pivot the levers 18 and 20; however, the pivotal movement of the lever 20 imparts less travel to pin 32 and rod 16 than to pin 30. Consequently, during this intermediate stage of braking, the master cylinder travel is less than the brake pedal travel. As a result the connecting member 26 moves at a faster rate of travel than the rod 16 so that the connecting member is moving toward the master cylinder relative to the pin 32, as shown in FIG. 3.

Figure 3:
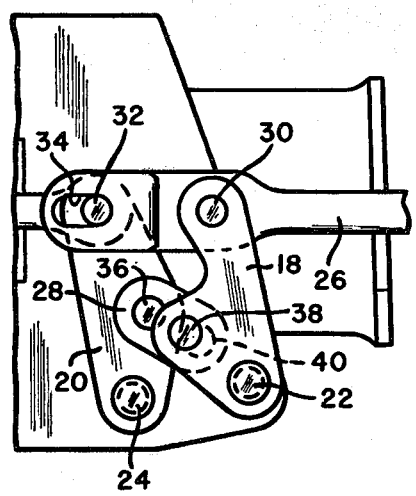
FIG. 3 is a view similar to FIG. 2 showing the linkage assembly in a further stage of a brake application.
Figure 4:
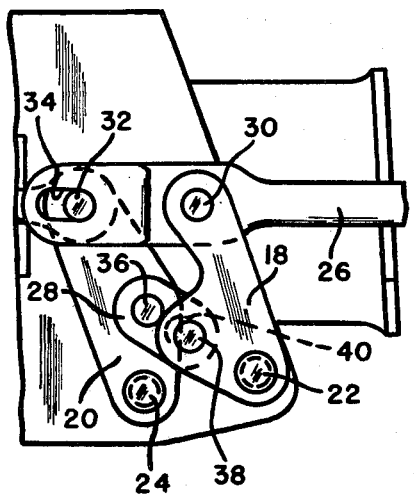
FIG. 4 is a view similar to FIG. 3 showing the linkage assembly in a final stage of a brake application.

Finally, in FIG. 3 and FIG. 4 the connecting member 26 has caught up with the pin 32 and rod 16 so that during a final stage of braking the movement of the brake pedal is equal to the movement of the master cylinder. During this final stage of braking, the pin 38 on lever 18 moves relative to the connecting member 28 away from the end of slot 40 nearest pin 36.

Figure 5:
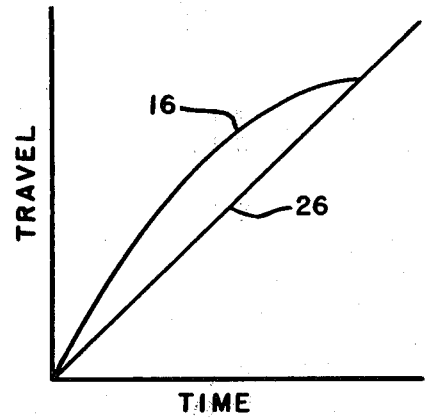
FIG. 5 is a graph illustrating travel versus time for the brake pedal and the master cylinder assembly.

Viewing FIG. 5, the graph illustrates the travel for the master cylinder and brake pedal as they vary over the time of a brake application. The slope of both curves provides information on the rate of travel for the master cylinder and the brake pedal. From the curves, it is seen that the rate of travel for the master cylinder starts out faster than for the brake pedal which is assumed to be constant for purposes of illustration. At an intermediate location on the master cylinder curve the slope is equal to the brake pedal slope and thereafter the rate of travel for the master cylinder is less than the rate of travel for the brake pedal until the master cylinder and brake pedal move together.

In a first alternative embodiment (not shown), the slot 40 of the second connecting member can be positioned at the other end of the second connecting member provided the pin 36 is engageable with the right end of the slot in the rest position illustrated in FIG. 1. Also, with this alternative embodiment, the pin 38 would be pivotally fixed to the second connecting member rather than extending into a slot.

A second alternative embodiment (not shown) provides for the slot 40 to be positioned on either lever 18 or 20 provided the respective pins 38 and 36 are positioned to the right and left ends of the slot and the second connecting member is free of any slots for receiving the pins 36 and 38.

Furthermore, it is feasible that a power booster, either hydraulic or pneumatic, could be disposed between the master cylinder and the linkage assembly.

I claim:

1. A brake linkage for connecting a brake pedal assembly with a master cylinder assembly, the brake pedal assembly and the master cylinder assembly being carried by a frame, said brake linkage comprising a first lever coupled to said frame and a connecting member coupled to said brake pedal assembly and said first lever, a second lever coupled to said frame and said master cylinder, and a link extending between said first and second levers, said connecting member defining a lost-motion connection with said master cylinder assembly, said link defining a lost-motion connection with one of said first and second levers, said connecting member being movable during an initial brake application to pivot said first lever relative to said frame, whereby said first lever imparts movement to said link and said second lever imparts movement to said master cylinder assembly at a rate greater than the movement of said connecting member, said connecting member being movable during an intermediate brake application to pivot said first lever relative to said frame, whereby said first lever imparts movement to said link and said second lever to impart movement to said master cylinder at a rate less than the movement of said brake pedal assembly, said connecting member abutting said master cylinder assembly during a final brake application to cause said connecting member and said master cylinder assembly to move at substantially the same rate, and said connecting member being operatively connected, with both said second lever and said master cylinder assembly via a single pin.

2. The brake linkage of claim 1 in which said link defines a lost-motion connection with said first lever.

3. The brake linkage of claim 1 in which said brake pedal assembly defines a slot for receiving a portion of said master cylinder assembly, said master cylinder portion moving from one end of said slot to the other end of said slot up to the intermediate brake application and said master cylinder portion returning to said one end during the final brake application.

4. The brake linkage of claim 1 in which said first and second levers each carry at least three pins permitting pivotal movement of each lever relative to said three pins.

5. The brake linkage of claim 1 in which said link is engageable with said first and second levers at an intermediate location between said frame and said assemblies.

6. In a brake linkage assembly having a plurality of members which are movable during a brake application to transmit movement from a brake pedal assembly to a master cylinder assembly, and the brake pedal assembly and the master cylinder assembly being carried by a frame, characterized by said brake linkage assembly including a pair of members pivotally secured to said frame, a first connecting member extending between said brake pedal and said master cylinder and a second connecting member extending between said pair of members, said first connecting member being secured to said brake pedal assembly and defining a first lost-motion connection with said master cylinder assembly, said second connecting member being secured to one of said pair of members and defining a second lost-motion connection with said other member, said first connecting member defining a substantially horizontal axis between said brake pedal and said master cylinder assembly and said first connecting member cooperating with a pair of pins connecting with said pair of members, respectively, and said pair of pins is movable within the horizontal aixs during the brake application.

7. The brake linkage assembly of claim 6 further characterized by said first lost-motion connection also being established between said first connecting member and said one member.

* * * * *